United States Patent
Tschuor et al.

(10) Patent No.: US 8,950,192 B2
(45) Date of Patent: Feb. 10, 2015

(54) GAS TURBINE

(75) Inventors: Remigi Tschuor, Windisch (CH);
Russell Bond Jones, Jupiter, FL (US);
Luis J. Rodriguez, West Palm Beach, FL (US); Hartmut Haehnle, Kuessaberg (DE); Marion Duggan (-Oneil), Daytona Beach, FL (US)

(73) Assignee: Alstom Technology Ltd., Baden (CH)

( * ) Notice: Subject to any disclaimer, the term of this patent is extended or adjusted under 35 U.S.C. 154(b) by 985 days.

(21) Appl. No.: 12/857,131

(22) Filed: Aug. 16, 2010

(65) Prior Publication Data

US 2011/0135451 A1 Jun. 9, 2011

Related U.S. Application Data

(63) Continuation of application No. PCT/EP2009/051518, filed on Feb. 10, 2009.

(30) Foreign Application Priority Data

Feb. 20, 2008 (CH) ........................................ 246/08

(51) Int. Cl.
*F02C 7/28* (2006.01)
*F01D 9/02* (2006.01)

(52) U.S. Cl.
CPC . *F01D 9/023* (2013.01); *F02C 7/28* (2013.01); *F05D 2240/55* (2013.01); *F05D 2250/42* (2013.01)
USPC ................... 60/800; 60/805; 60/806; 60/804

(58) Field of Classification Search
USPC .............................. 60/805, 806, 752, 800, 798
See application file for complete search history.

(56) References Cited

U.S. PATENT DOCUMENTS

| | | | | |
|---|---|---|---|---|
| 2,988,886 A | * | 6/1961 | Hamm et al. | 60/752 |
| 3,965,066 A | * | 6/1976 | Sterman et al. | 60/800 |
| 4,157,232 A | * | 6/1979 | Bobo et al. | 415/116 |
| 4,379,560 A | * | 4/1983 | Bakken | 277/628 |
| 4,465,284 A | * | 8/1984 | Szema | 415/178 |

(Continued)

FOREIGN PATENT DOCUMENTS

| | | |
|---|---|---|
| DE | 4324035 A1 | 1/1995 |
| EP | 0321809 A1 | 6/1989 |

(Continued)

OTHER PUBLICATIONS

International Search Report for PCT/EP2009/051518 mailed on Jun. 4, 2009.

*Primary Examiner* — Ted Kim
(74) *Attorney, Agent, or Firm* — Buchanan Ingersoll & Rooney PC

(57) ABSTRACT

A gas turbine includes a turbine section; an annular combustor disposed upstream of the turbine section and configured to discharge a hot gas flow on an outlet side to the turbine section; an outer shell delimiting the combustor and splittable at a parting plane; a plenum enclosing the outer shell; a rotor; a turbine vane carrier encompassing the rotor; a plurality of stator vanes disposed on the vane carrier, and at least two sealing segments forming a ring, each of the at least two sealing segments having an inner edge and a head and a foot section and being movably mounted on the inner edge by the foot section to the outer shell and by the head section to the turbine vane carrier so as to mechanically connect the combustor to the turbine vane carrier.

19 Claims, 11 Drawing Sheets

(56) References Cited

U.S. PATENT DOCUMENTS

| | | | |
|---|---|---|---|
| 4,932,861 A | 6/1990 | Keller et al. | |
| 5,189,874 A * | 3/1993 | Kreitmeier | 60/806 |
| 5,226,278 A * | 7/1993 | Meylan et al. | 60/755 |
| 5,470,198 A | 11/1995 | Harrogate et al. | |
| 5,553,999 A * | 9/1996 | Proctor et al. | 415/173.1 |
| 5,588,826 A | 12/1996 | Doebbeling et al. | |
| 5,706,646 A | 1/1998 | Wilde et al. | |
| 5,954,477 A * | 9/1999 | Balsdon | 416/95 |
| 6,347,508 B1 * | 2/2002 | Smallwood et al. | 60/800 |
| 6,666,645 B1 * | 12/2003 | Arilla et al. | 415/116 |
| 2003/0046940 A1 | 3/2003 | Matsuda et al. | |
| 2003/0165381 A1 * | 9/2003 | Fokine et al. | 415/110 |
| 2004/0011059 A1 * | 1/2004 | Tiemann | 60/752 |
| 2006/0123797 A1 * | 6/2006 | Zborovsky et al. | 60/800 |
| 2006/0179770 A1 * | 8/2006 | Hodder | 52/588.1 |
| 2006/0288707 A1 | 12/2006 | Weaver et al. | |
| 2009/0072497 A1 * | 3/2009 | Kunitake et al. | 277/641 |
| 2009/0094986 A1 * | 4/2009 | Bottcher et al. | 60/752 |
| 2010/0037621 A1 * | 2/2010 | Tschuor et al. | 60/752 |

FOREIGN PATENT DOCUMENTS

| | | |
|---|---|---|
| EP | 0704657 A2 | 4/1996 |
| EP | 0743424 A1 | 11/1996 |

* cited by examiner

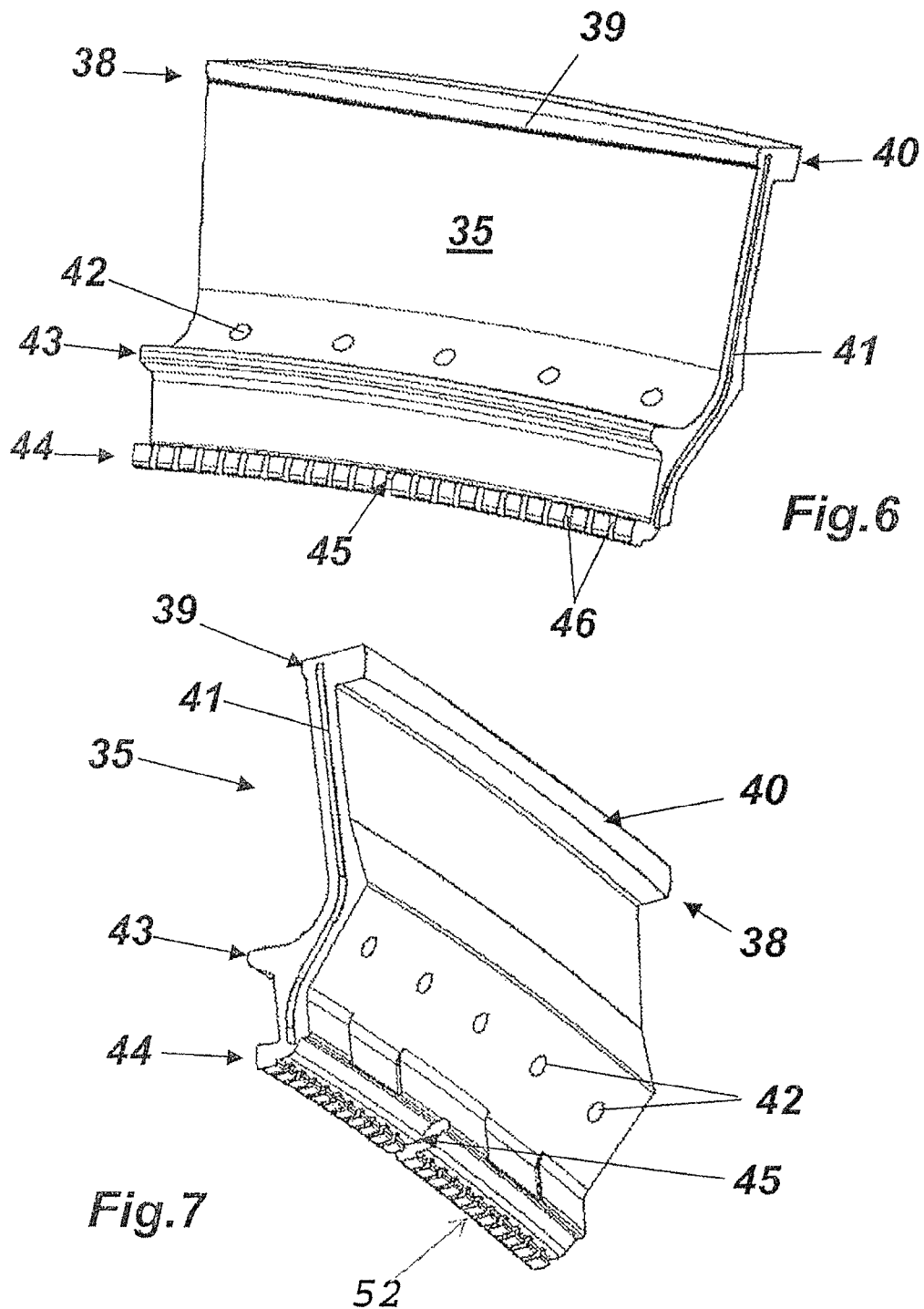

GAS TURBINE

CROSS REFERENCE TO PRIOR APPLICATIONS

This application is a continuation of International Patent Application No. PCT/EP2009/051518, filed on Feb. 10, 2009, which claims priority to Swiss Application No. CH 00246/08, filed Feb. 20, 2008. The entire disclosure of both applications is incorporated by reference herein.

FIELD

The present invention relates to the field of thermal machines.

BACKGROUND

Modern industrial gas turbines (IGT) as a rule are designed with annular combustors. In most cases, smaller IGTs are constructed with so-called "can-annular combustors". In the case of an IGT with annular combustor, the combustion chamber is delimited by the side walls and also by the inlet and outlet planes of the hot gas. Such a gas turbine originates from FIGS. 1 and 2. The gas turbine 10 which is shown in detail in FIGS. 1 and 2 has a turbine casing 11 in which a rotor 12 which rotates around an axis 27 is housed. On the right-hand side, a compressor 17 for compressing combustion air and cooling air is formed on the rotor 12, and on the left-hand side a turbine 13 is arranged. The compressor 17 compresses air which flows into a plenum 14. In the plenum, an annular combustor 15 is arranged concentrically to the axis 27 and on the inlet side is closed off by means of a front plate 19 which is cooled with front-plate cooling air 20, and on the outlet side is in communication via a hot gas passage 25 with the inlet of the turbine 13.

Burners 16, which for example or preferably are designed as premix burners and inject a fuel-air mixture into the combustor 15, are arranged in a ring in the front plate 19. Such premix burners originate for example from EP-A1-321 809 or from EP-A1-704 657, wherein these publications and the development which is derived from them form an integrated constituent part of this application. The hot air flow 26 which is formed during the combustion of this fuel-air mixture reaches the turbine 13 through the hot gas passage 25 and is expanded in the turbine, performing work. The combustor 15 with the hot gas passage 25 is enclosed on the outside, with a space, by an outer and inner cooling shroud 21 or 31 which by means of fastening elements 24 are fastened on the combustor 15, 25 and between which and the combustor 15, 25 an outer and inner cooling passage 22 or 32 is formed. In the cooling passages 22, 32, cooling air flows in the opposite direction to the hot gas flow 26 along the walls of the combustor 15, 25 into a combustor dome 18, and from there flows into the burners 16, or as front plate cooling air 20, flows directly into the combustor 15. The outer cooling shroud 21, as shown in FIG. 3, can be extended by means of an impingement cooling plate 30 which is provided with holes through which the cooling air jets enter the cooling passage 22 and impinge perpendicularly upon the outer shell 23.

The side walls of the combustor 15, 25 in this case are constructed either as shell elements or are formed as complete shells (outer shell 23, inner shell 33). When using complete shells, for installation reasons the necessity arises of providing a parting plane (34 in FIG. 4) which allows an upper half of the shell 23, 33 (23a in FIG. 4) to be detached from the remaining lower half of the shell (23b in FIG. 4), for example in order to install or to remove the gas-turbine rotor 12. The parting plane 34 correspondingly has two parting-plane welded seams which in the example of the gas turbine are located at the level of the machine axis 27 (FIG. 1).

A flange 28 with an encompassing groove 29 (FIG. 3) is attached at the ends of the shells 23, 33 and for reasons of mechanical strength can be reinforced by means of a connecting element in the form of a bridge 37 (FIG. 4) which reaches across the parting plane 34.

For the mechanical connection between the annular combustor 15, 25 and a subsequent turbine vane carrier TVC (pos. 47 in FIGS. 8 to 13), which carries the stator vanes of the subsequent turbine 13, and for dividing the plenum 14 into different chambers, sealing segment are provided, which are hooked on the combustor and on the turbine vane carrier in a movable manner and together form a sealing ring, which is arranged concentrically to the axis 27, between combustor and turbine vane carrier.

The sealing segments (similar to pos. 35' in FIG. 4 and to pos. 35 in FIG. 5) should ideally feature the following functions or characteristics:

They seal two chambers of the plenum.
They should therefore also seal in relation to each other (requiring installation of a sealing lip between adjacent segments).
They mechanically interconnect two construction modules (combustor vs. turbine vane carrier).
They form an intermediate piece/transition piece between two construction modules (combustor vs. turbine vane carrier).
They are axially-symmetrically constructed (with exception of the segments on the parting plane).
They are able to have cooling holes/bores (for a specific mass flow of cooling air).
They should absorb large axial and radial forces.
They should have a large axial and radial movement clearance, especially during transient operations.
They should be resistant to temperature (fatigue strength-creep strength).
They should be simply and inexpensively producible.
They must not rotate in the circumferential direction during operation—this necessitates the installing of circumferential locking means.

The sealing segments are to be installed before inserting the outer shells 23 into the flange 28 which is provided for it, but they could also first be installed in the gas turbine. The sealing segments can have a circumferential locking means. For the circumferential locking means, for example a groove is provided and a locking pin, having already been welded in, is located in the flange 28 of the outer shell 23.

The sealing segments can furthermore have a groove or a slot for narrow seals (knife-edge seals) in the side faces ("wedge faces"). During installation, these seals also have to be inserted. The inserting of the seals into the grooves, and additionally the inserting of the sealing segments into the flange which is provided for them, can prove to be exceptionally awkward and is directly dependent upon the geometric design of the sealing-segment foot (pos. 44 in FIG. 4), and also upon the design of the outer-shell flange 28. The outer shells 23, which are thermally very severely stressed, move transiently axially and radially; in doing so, high compressive and tensile stresses ensue.

The sealing segment forms the (mechanical) linking element from the combustor 15, to the turbine vane carrier 47, which element moves transiently in a predominantly axial manner. The operating period which is required by the outer shell 23 is typically two so-called service intervals ("service intervals/service cycles"). An operating interval describes the time between the (re-)commissioning of the combustor and the reconditioning of the components.

SUMMARY OF THE INVENTION

It has now become apparent in practice that during operation the outer shells 23 begin to break down, often at the end of the parting-plane welded seams. It is assumed that the breaking down can also be caused by the outer shell, especially during the transient movements, not having adequate clearance and additional mechanical stresses acting upon the outer shell as a result.

An aspect of the invention is to create a thermal machine, especially a gas turbine, which avoids the aforementioned disadvantages of known machines and absolutely minimizes by constructional measures the risk of breaking down of the welded combustor shells.

In an embodiment, the sealing segments are mounted so that the combustor or the outer shell can move relative to the turbine vane carrier independently of each other in the axial direction and in the radial direction.

One development of the gas turbine according to the invention is characterized in that the sealing segments are mounted by the head in a locating space on the turbine vane carrier in such a way that they are radially movable there and pivotable around the head. In particular, the sealing segments can be mounted by the foot on the outer shell of the combustor in such a way that they are pivotable around the foot.

Another development of the invention is characterized in that the outer shell at the turbine-side end has a flange, in that the flange on the outer side is provided with an encompassing groove, and in that the sealing segments are pivotably mounted by the foot in the groove. The groove preferably has an L-shaped cross-sectional profile with an undercut, wherein the foot is formed in the shape of a hook and fits behind the undercut.

Furthermore, the foot can advantageously have first means for circumferential locking which especially comprise a locking groove which is provided in the foot, extends in the axial direction, and in which engages a locking pin which is fixed on the flange.

A further development of the invention is characterized in that the foot has second means for it, which preferably comprise a multiplicity of cooling slots which are arranged in the foot next to each other in the circumferential direction.

Another development is characterized in that between adjacent sealing segments sealing means are provided for sealing the gaps between the sealing segments. The sealing means preferably comprise sealing grooves in the side faces and knife-edge seals which are inserted in the sealing grooves.

According to a further development of the invention, the locating space on the turbine vane carrier is formed between the turbine vane carrier and a holding plate which is fastened on the turbine vane carrier (pos. 47 in FIG. 8), wherein the locating space has a rectangular cross section and an opening which extends inwards in the radial direction and through which the sealing segments extend by their head into the locating space, wherein the axial width of the locating space is approximately equal to the width of the head of the sealing segments, and wherein the radial height of the locating space is a multiple of the radial height of the head, and the locating space in the region of the opening is formed so that the sealing segments in the installed state are secured against slipping out of the locating space. Rectangular as used herein means essentially rectangular. In particular, the locating space in the region of the opening has a shoulder, behind which the sealing segments are hooked in by the head.

The sealing segments preferably have abutment faces on the head which abut against the walls of the locating space and are constructed in a cambered manner. The turbine-side abutment face in this case is advantageously constructed so that it has a straight contact line with the wall of the locating space. In this case, this straight contact line is machined so that it is ensured that the sealing segment can roll upon it as a result.

Another development is characterized in that bridges which overlap the parting plane are arranged in the groove of the flange for mechanical stabilization of the welded outer shell, and in that the sealing segments which are adjacent to the parting plane have a corresponding recess for adapting to the bridges.

Furthermore, according to requirement provision can be made for the sealing segments to be equipped with cooling holes, which are arranged in the segment surface, for the passage of cooling air.

BRIEF DESCRIPTION OF THE DRAWINGS

The invention is to be explained in more detail in the following based on exemplary embodiments in conjunction with the drawing. All features which are not essential for the direct understanding of the invention have been omitted. Like elements are provided with the same designations in the various figures. The flow direction of the media is indicated with arrows. In the drawing

FIG. 6 shows the sealing segment according to FIG. 4 from another angle of view;

FIG. 7 shows the sealing segment according to FIG. 4 as seen from the bottom.

DETAILED DESCRIPTION

A new-type sealing segment with an additional, widened movement clearance with simultaneous ensuring of adequate mechanical strength and required aerodynamic air-tightness, is disclosed. The sealing segment is constructed so that on the foot of the segment it is locally cooled in a directed manner over the entire circumference of the flange. The mass flow of cooling air in this case in no longer interrupted, not even in the transient extreme positions of the sealing segment.

As already mentioned above, the new-type sealing segments are characterized by the following constructional details:

They can be cast

They seal in relation to each other, wherein the installation of a sealing lip is required for this.

They mechanically interconnect two constructional modules (combustor vs. turbine vane carrier).

They form an intermediate piece/transition piece between two constructional modules (combustor vs. turbine vane carrier).

They are axially symmetrically constructed, with exception of the segments on the parting plane.

They are able to have cooling holes (for a specific mass flow of cooling air).

They absorb large axial and radial forces.

They have a large axial and radial movement clearance, especially in the transient ranges.

They are resistant to temperature (fatigue strength-creep strength).

They have circumferential locking means.

The feet of the sealing segments are designed so that these accurately fit into the respective flange geometry, and during operation, despite the thermal deformation of the shells and of the flange, are furthermore able to support the flange and at the same time allow an adequate mass flow of cooling air.

The head of the sealing segment is constructed so that on the rear side the cambered (convex) face can roll linearly on the turbine vane carrier. The front side, on the other hand, ordinarily sometimes hangs transiently in the retaining plate which in its turn is screwed to the turbine vane carrier. This greatly increased movement clearance, with the same functionality of the sealing segment in its extreme positions, in this case is the center of interest of the present invention.

The exemplary embodiment which is shown in FIGS. 4 to 13 refers to the use of the invention in the outer shell of a gas turbine. Uses are shown here which can be applied during various transient states of the gas turbine. The design principles according to the invention, however, naturally also apply to a comparable use in the case of a constructionally new design.

Figure 1:
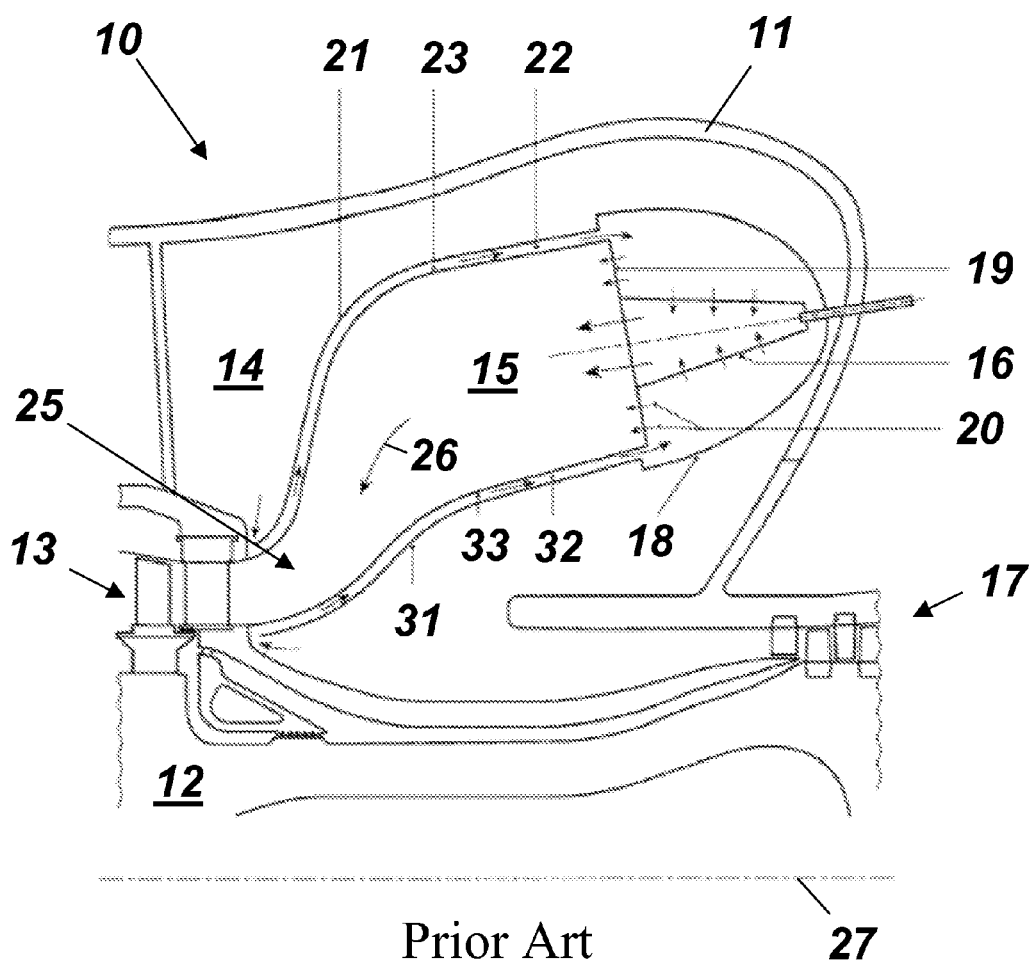
FIG. 1 shows the longitudinal section through a cooled annular combustor of a gas turbine according to the prior art.
Figure 2:
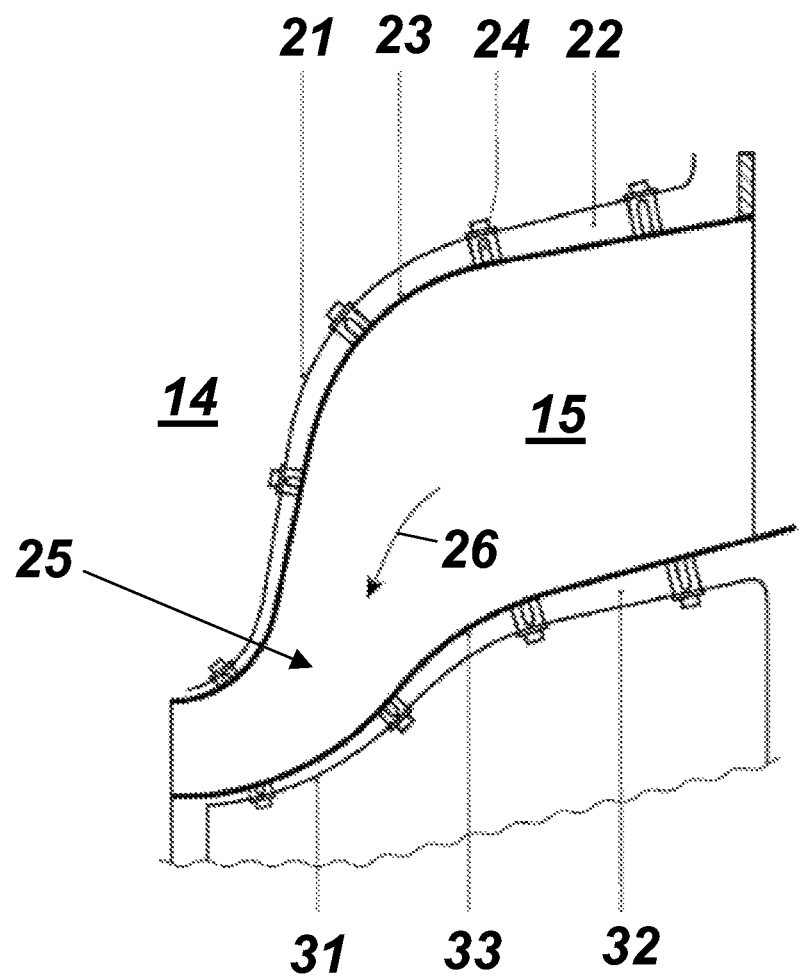
FIG. 2 shows in detail the annular combustor from FIG. 1 with the cooling shrouds fastened on the outside.
Figure 3:
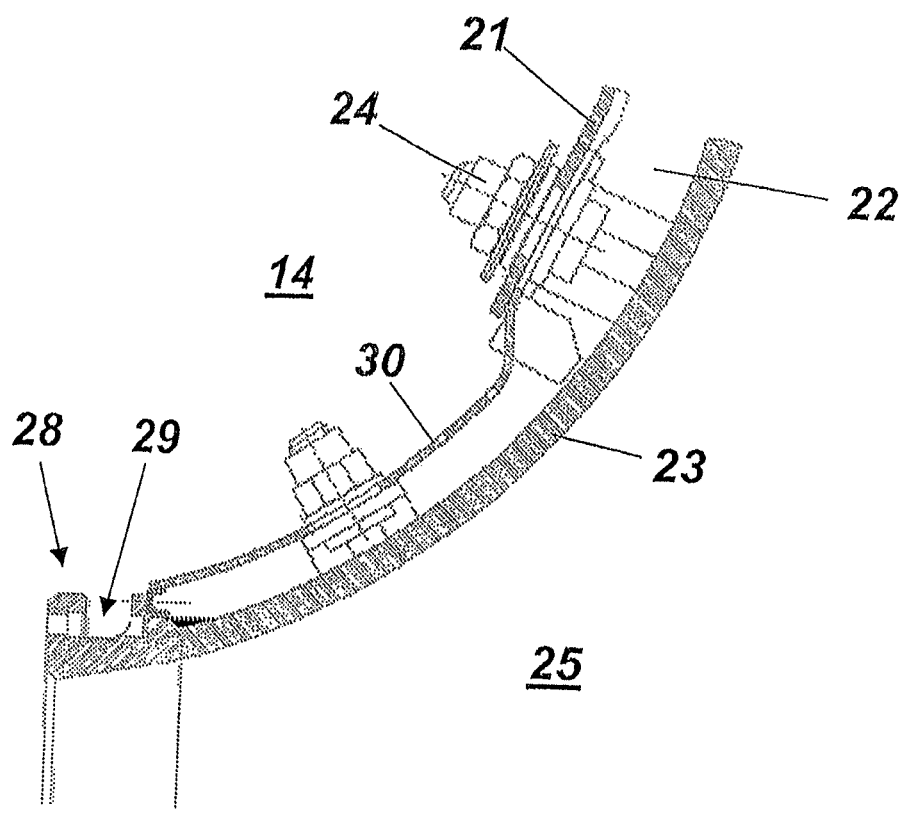
FIG. 3 shows in longitudinal section the turbine-side end of the outer shell of the combustor from FIG. 1 with the flange fitted.

As already further explained in the above, in the case of a gas turbine with annular combustor 15, 25 the combustion chamber is delimited by the side walls 23, 33 and also by the inlet and outlet planes of the hot gas (FIGS. 1, 2). The combustor side walls in this case are constructed either as shell elements or as complete shells. When using complete shells, for installation reasons the necessity of a parting plane (34 in FIG. 4) arises, which allows the upper section (for example the upper half 23a of the outer shell 23) to be detached, for example in order to install or to remove the gas-turbine rotor 12. The parting plane 34 correspondingly has two parting-plane welded seams which in the example of a gas turbine are located at the level of the machine axis 27. The parting-plane flange 28, especially in the case of these gas turbines, is reinforced with bridges (pos. 37 in FIG. 4) and so the adjacent sealing segments 35' at the level of the bridges 37 must have a corresponding recess. Therefore, there are a greater number of normal sealing segments 35 (FIGS. 5-7) in the circumference, and on the parting plane 34 there are two so-called parting-plane sealing segments 35' which are arranged on the left and on the right of the parting plane 34 (FIG. 4).

The sealing segments 35, 35' according to FIGS. 4-7 have the form of circular segments which at the lower end have a foot which is formed in the shape of a hook, and at the upper end have a head 38 which is formed in the shape of a hook. Head 38 and foot 44 are connected via a wall which in the upper section extends in a straight line and in the lower section is double-curved. In the region of the upper first curve, cooling holes 42, which are distributed in the circumferential direction and through which the cooling air can pass, are arranged in the wall. In the region of the lower second curve, a strip which projects to the side is provided, which in specific operating states (FIG. 10) forms a stop.

Figure 4:
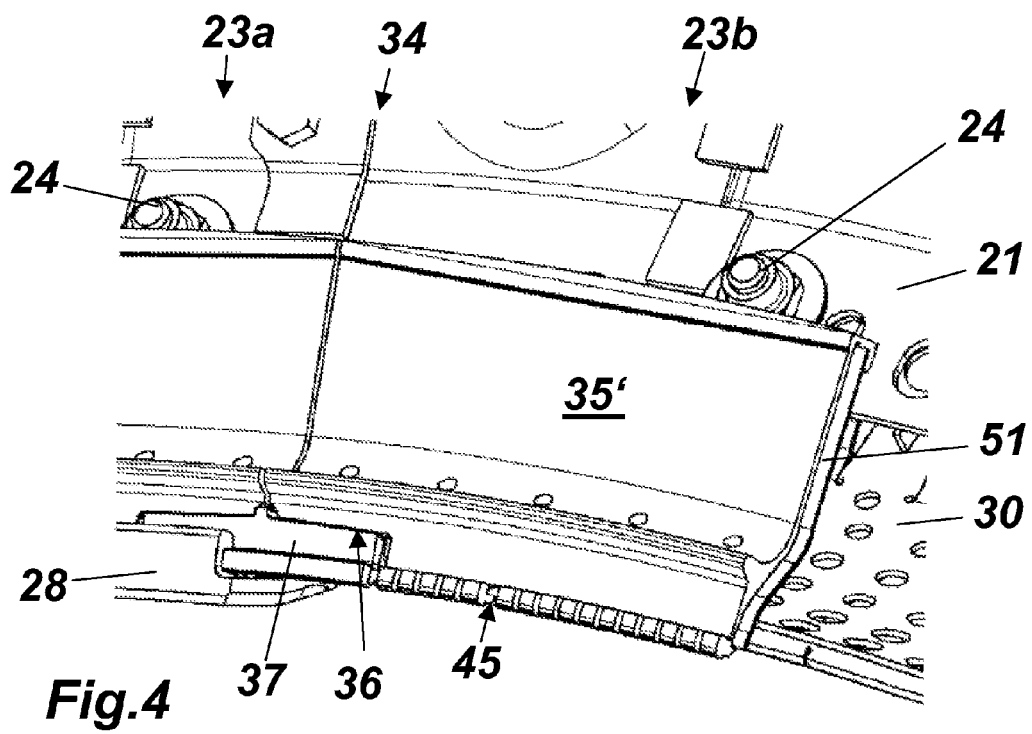
FIG. 4 shows in a detail the halves of an outer shell, which abut against each other in a parting plane, according to FIG. 3, with the specially formed sealing segments which are adjacent to the parting plane, according to a preferred exemplary embodiment of the invention.

The sealing segments 35, 35' according to FIGS. 4-7 have a circumferential locking means. For the circumferential locking means, a locking groove 45 is provided on the underside of the foot 44 (see especially FIG. 7). In the installed state of the sealing segments, a locking pin, which is not shown in the figures and which, having already been welded in, is located in the flange 28 of the outer shell 23, engages in the locking groove 45 (FIG. 4).

Figure 5:
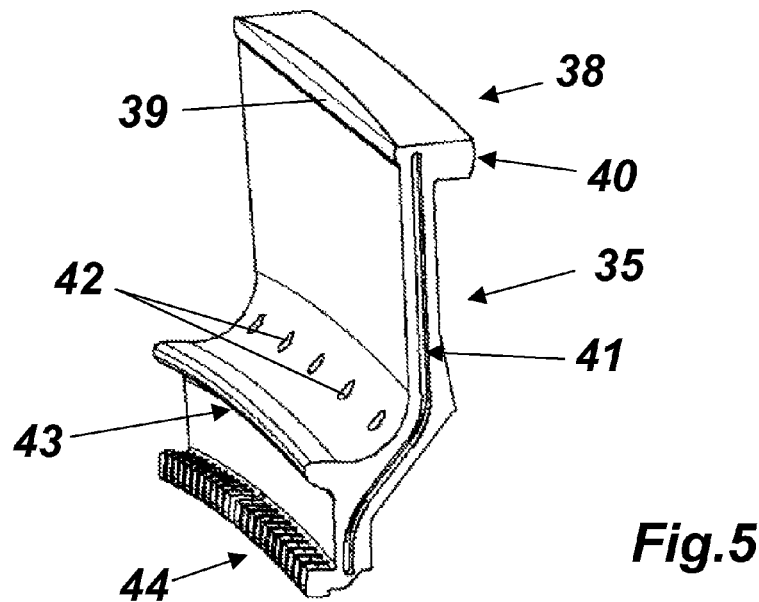
FIG. 5 shows in a perspective view a sealing segment, which is similar to FIG. 4, which is not adjacent to the parting plane.

In the side faces ("wedge faces"), the sealing segments 35, 35' have a sealing groove (slot) for narrow seals (knife-edge seals 51, FIG. 4). During installation, the knife-edge seals 51 must also be inserted. FIG. 4 shows the knife-edge seals in the installed state. FIGS. 5-7 show the sealing grooves 41, which are made for the knife-edge seals, in the side faces.

As already further mentioned above, the inserting of the knife-edge seals 51 into the sealing grooves 41, and additionally the inserting of the sealing segments 35, 35' into the flange 28 which is provided for them, can prove to be exceptionally awkward, and it is directly dependent upon the geometric design of the sealing-segment foot 44 (FIGS. 5-7) and also upon the design of the outer-shell flange 28. The cross-sectional profiles and the geometry of the two parts are evident for example from FIG. 9.

The feet 44 of the sealing segments 35, 35' must be designed so that these fit accurately into the respective flange geometry of the flange 28 and during operation, despite the thermal deformation of the shells 23, 33 and of the flange 28, are furthermore "able to support" the flange 28 and consequently the combustor, and allow a mass flow of cooling air. From FIGS. 8-13, which refer to different operating states of the gas turbine and are correspondingly characterized by different axial and radial distances B, C and A between combustor 15, 25 and turbine vane carrier 47 (B, C), or sealing segment 35, 35' and turbine vane carrier 47 (A), the associated positions of the sealing segments 35, 35' are apparent.

Figure 9:
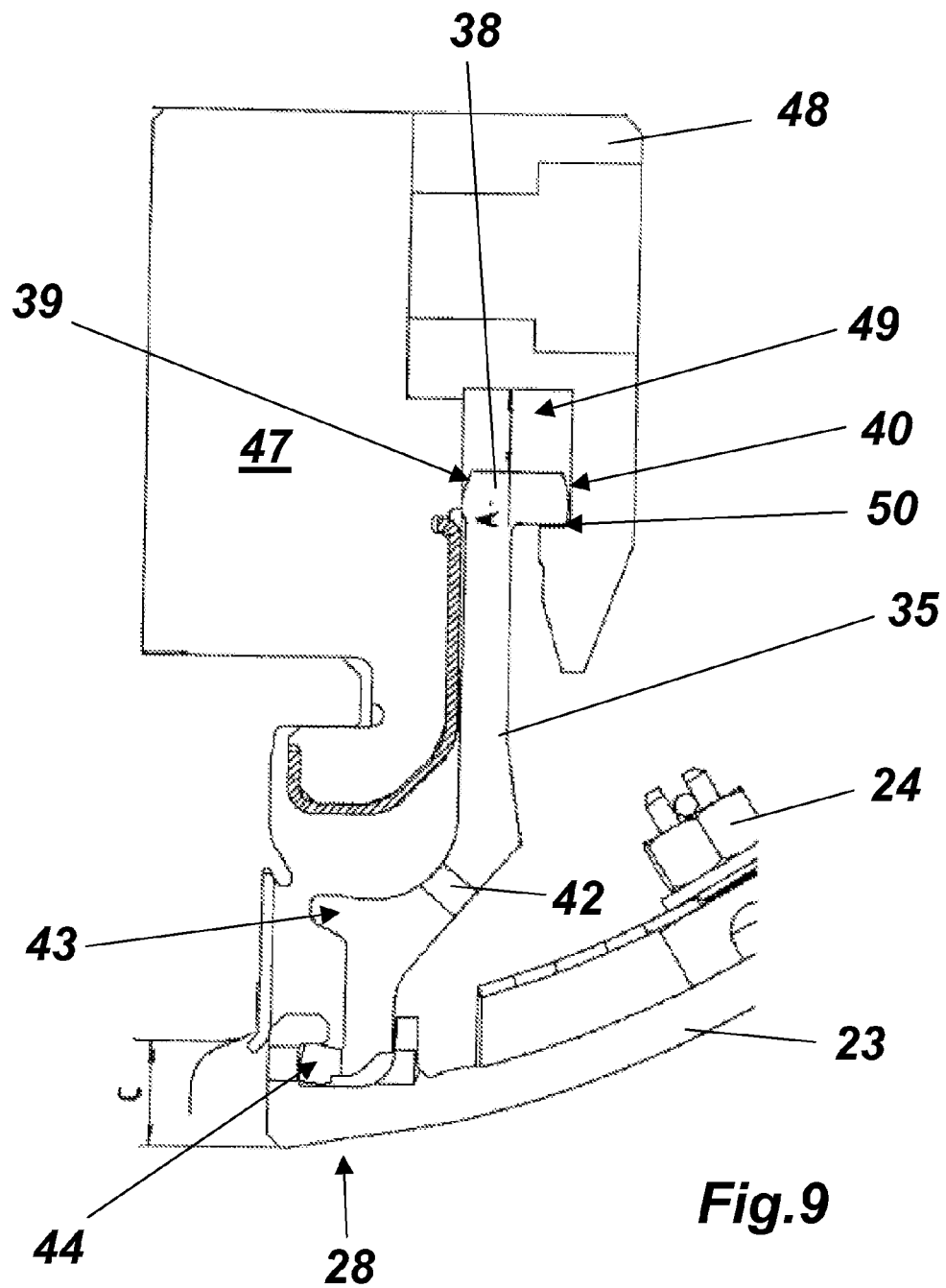
Figure 10:
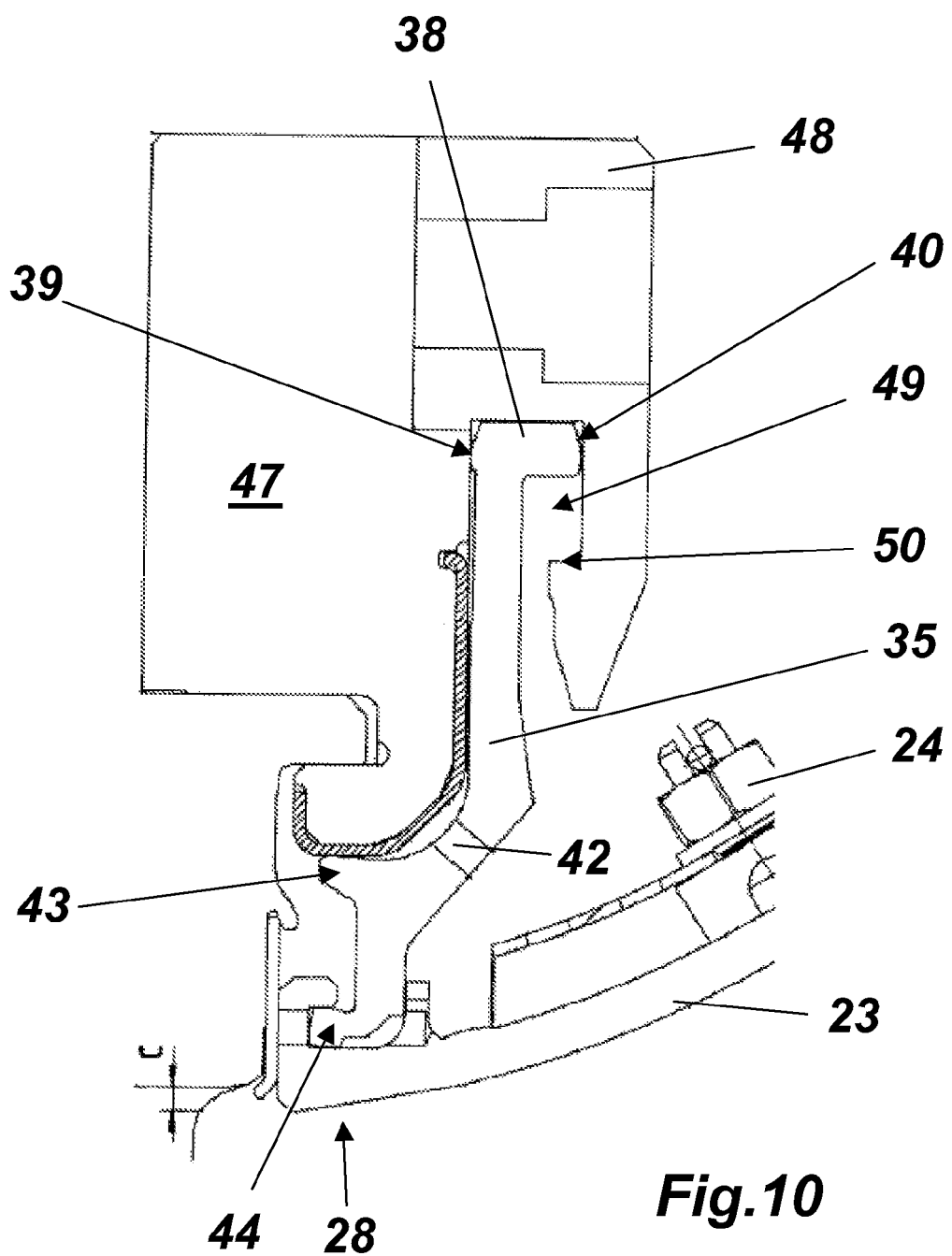

In the operating states according to FIGS. 9 and 10, the axial distance B between flange 28 and turbine vane carrier 47 is zero, whereas the radial distance A between the head 38 of the sealing segments 35, 35' and the top of the locating space 49, as well as the radial distance C between combustor and turbine vane carrier, are maximum (FIG. 9) or minimum (FIG. 10). In the case of the minimum distance A=0, the sealing segments 35, 35' make contact with the head 38 and with the strip 43 (FIG. 10). In the case of the maximum distance A (FIG. 9), the sealing segments 35, 35' hang by their hook-shaped head 38 on the shoulder 50 in the locating space 49.

Figure 8:
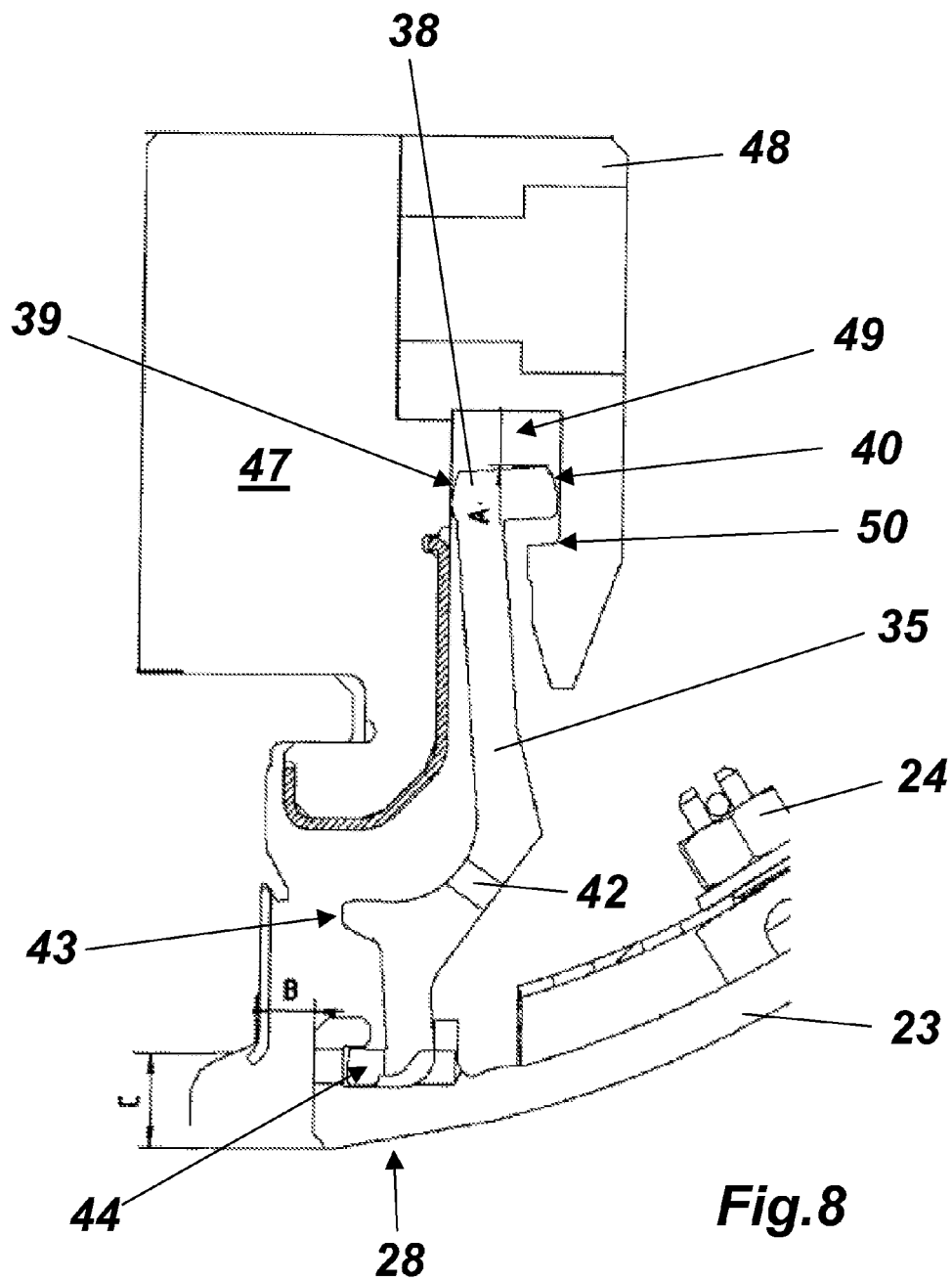
FIGS. 8-13 for illustrating the large movement clearance, show in longitudinal section different positions of combustor and turbine vane carrier relative to each other, and the associated position of a sealing segment according to FIGS. 5-7.

In the operating state according to FIG. 8, the axial distance is B>0, whereas the radial distance C is slightly reduced compared with FIG. 9. The sealing segments 35, 35' are slightly tilted to the left, which corresponds to a pivoting around the foot 44.

Figure 11:
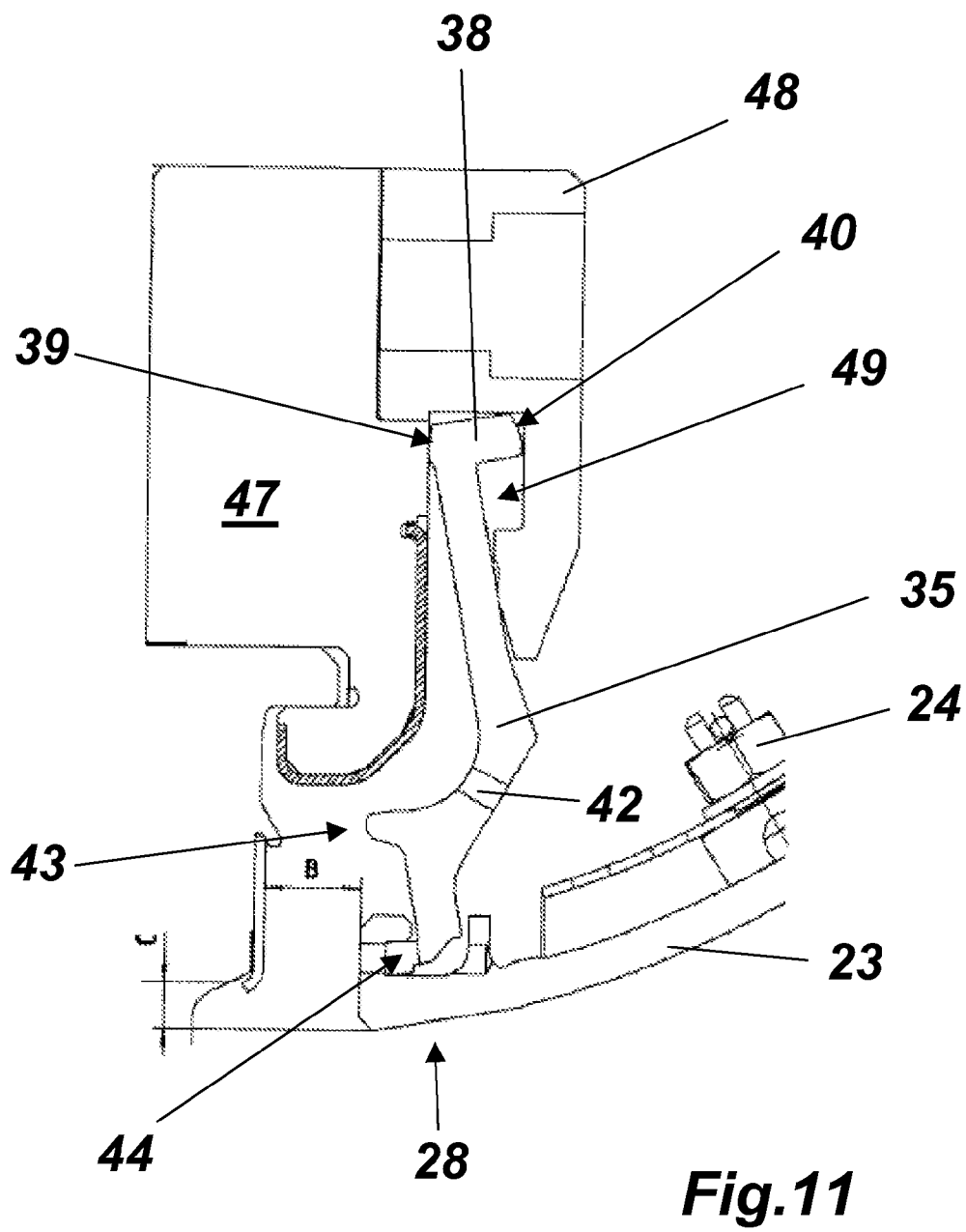

In the operating state according to FIG. 11, the axial distance B has been further increased and the radial distance is once again reduced. The sealing segments 35, 35' are tilted further to the left until at the top they abut by the head 38 in the locating space 49 and by the straight part of the wall abut against the lower end of the holding plate 48.

Figure 12:
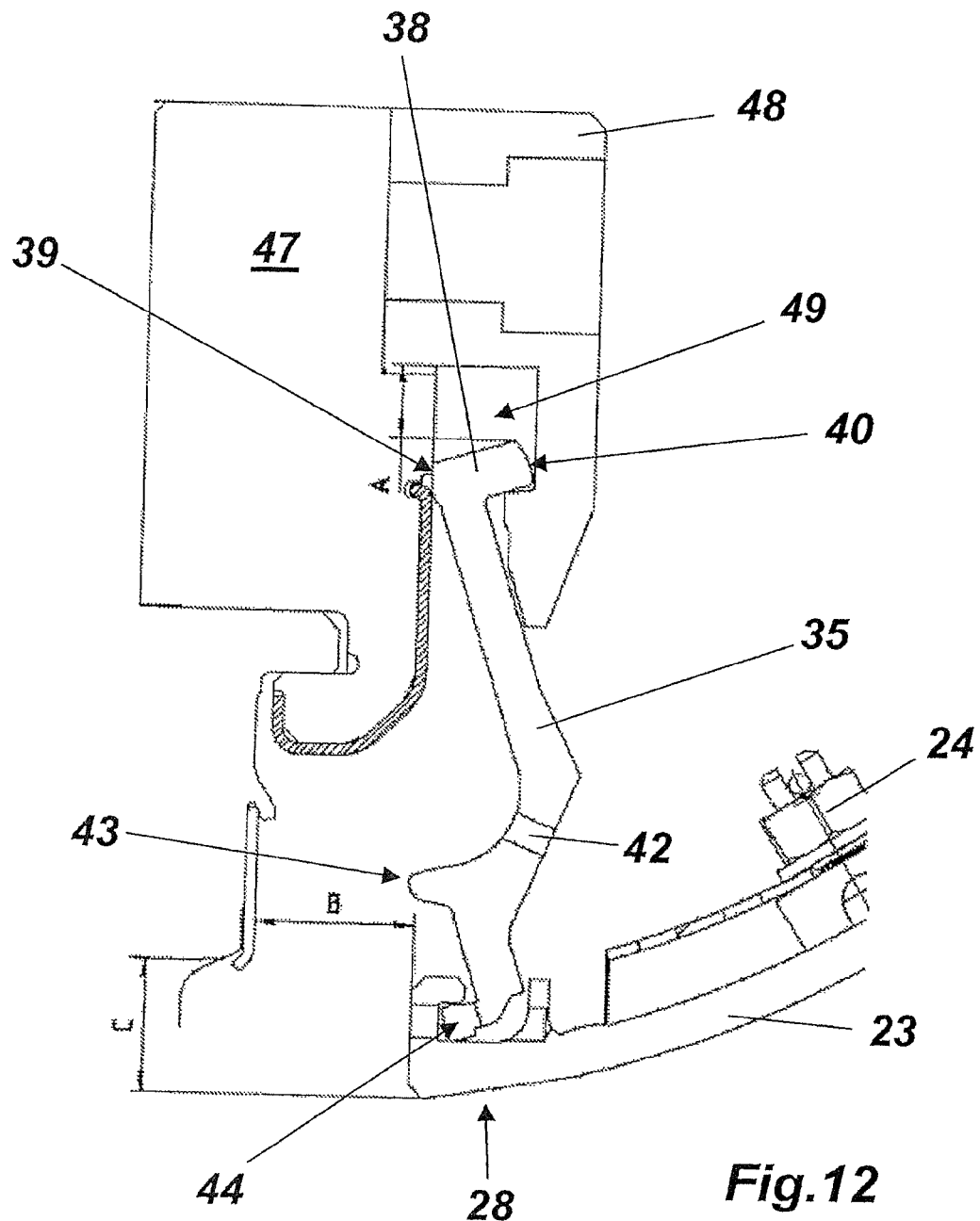

A further (maximum) tilting according to FIG. 12 is then possible if at the same time the radial distance C is maximum.

Figure 13:
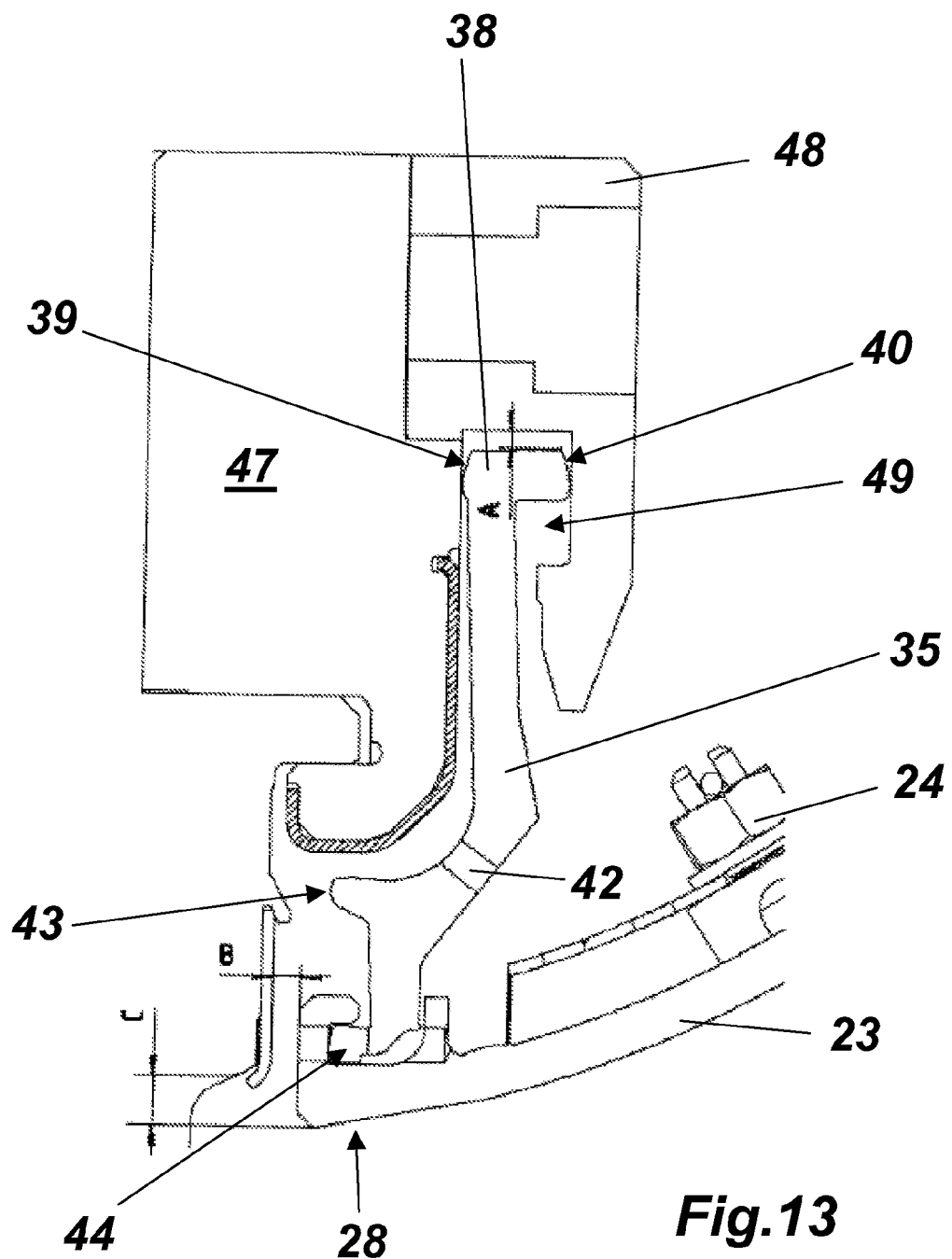

An average operating state is finally shown in FIG. 13, all the distances A, B and C having an average value in this case.

The head 38 of the sealing segment 35, 35' is constructed so that (on the rear side) the cambered (convex) sealing face 39 can roll linearly on the turbine vane carrier 47 (FIG. 8). The front side, specifically the hooking strip 40, on the other hand ordinarily sometimes "hangs" transiently in the holding plate or retaining plate 48 which in its turn is screwed to the turbine vane carrier 47 (FIG. 9 and FIG. 12).

The sealing segment 35, 35' in this case is constructed so that on the foot 44 of the segment it is locally cooled in a directed manner over the entire circumference of the flange 28. The mass flow of cooling air is no longer interrupted, even in transient extreme positions of the sealing segment 35, 35' (FIG. 12). This is achieved inter alia by a multiplicity of cooling slots 46 being provided in the foot 44 and distributed in the circumferential direction, and by the foot 44 being delimited on the underside by means of a corrugated surface 52 which leaves room for the cooling air flow between flange 28 and foot 44.

LIST OF DESIGNATIONS

10 Gas turbine
11 Turbine casing
12 Rotor
13 Turbine
14 Plenum
15 Combustor
16 Burner (double-cone burner or EV-burner)
17 Compressor
18 Combustor dome
19 Front plate
20 Front-plate cooling air
21 Outer cooling shroud
22 Outer cooling passage
23 Outer shell
23a Upper half of the outer shell
23b Lower half of the outer shell
24 Fastening element
25 Hot gas passage
26 Hot gas flow
27 Axis
28 Flange
29 Groove (flange)
30 Impingement cooling plate
31 Inner cooling shroud
32 Inner cooling passage
33 Inner shell
34 Parting plane
35, 35' Sealing segment
36 Recess
37 Bridge (connecting element)
38 Head (sealing segment), head section
39 Sealing face
40 Hook-in strip
41 Sealing groove
42 Cooling hole
43 Strip
44 Foot (sealing segment), foot section
45 Locking groove
46 Cooling slot
47 Turbine vane carrier
48 Holding plate
49 Locating space
50 Shoulder
51 Knife-edge seal
A, B, C Distance

What is claimed is:

1. A gas turbine comprising:
   a turbine section;
   an annular combustor disposed upstream of the turbine section and configured to discharge a hot gas flow on an outlet side to the turbine section;
   an outer shell delimiting the combustor and splittable at a parting plane;
   a plenum enclosing the outer shell;
   a rotor;
   a turbine vane carrier encompassing the rotor;
   a plurality of stator vanes disposed on the vane carrier, and
   at least two sealing segments forming a ring, each of the at least two sealing segments having an inner edge and a head and a foot section and being movably mounted on the inner edge by the foot section to the outer shell and by the head section to the turbine vane carrier so as to mechanically connect the combustor to the turbine vane carrier, wherein the at least two sealing segments are mounted such that the combustor chamber or the outer shell have room for expansion relative to the turbine vane carrier independently of each other in an axial direction and in a radial direction,
   wherein the foot section includes a plurality of cooling slots disposed next to one another in a circumferential direction in the foot section, and each cooling slot extends from an upper surface of the foot section, to a front surface of the foot section, and from the front surface of the foot section to a bottom surface of the foot section.

2. The gas turbine as recited in claim 1, wherein each of the at least two sealing segments is mounted by the head section in a locating space on the turbine vane carrier so as to be radially movable by the head section in the locating space and is pivotable around the head section.

3. The gas turbine as recited in claim 2, further comprising:
   a holding plate fastened on the turbine vane carrier, wherein the locating space is formed between the turbine vane carrier and the holding plate.

4. The gas turbine as recited in claim 3, further comprising:
   a flange configured to mechanically stabilize the outer shell and a bridge overlapping the parting plane and disposed in a groove of the flange, wherein each of the at least two sealing segments is disposed adjacent to the parting plane and has a recess corresponding to the bridge and for adapting to the bridge.

5. The gas turbine as recited in claim 3, wherein the locating space has a rectangular cross section, an opening extending inwardly in a radial direction, an axial width approximately equal to a width of the head section and a radial height that is a multiple of a radial height of the head section, wherein the head section of each of the at least two sealing segments extends into the locating space and wherein a region of the opening is configured to secure the at least two sealing segments from slipping out of the locating space.

6. The gas turbine as recited in claim 5, wherein the locating space in the region of the opening includes a shoulder, the head sections of the at least two sealing segments hooking the shoulder.

7. The gas turbine as recited in claim 5, wherein the at least two sealing segments each include a cambered abutment face disposed on the head section abutting against a wall of the locating space.

8. The gas turbine as recited in claim 7, wherein the abutment face includes a straight contact line with the wall of the locating space.

9. The gas turbine as recited in claim 8, wherein the straight contact line is configured such that the at least two sealing segments can roll on the straight contact line.

10. The gas turbine as recited in claim 1, wherein each of the at least two sealing segments is mounted by the foot section on the outer shell so as to be pivotable around the foot section.

11. The gas turbine as recited in claim 1, wherein the outer shell in an area of the outlet side of the combustor has a flange having an encompassing groove, wherein each of the at least two sealing segments is pivotable in the encompassing groove around the foot section, and the entire circumference of the flange is cooled by the cooling slots in the foot section of the sealing segment.

12. The gas turbine as recited in claim 11, wherein the encompassing groove includes an L-shaped cross-sectional profile with an undercut, and wherein the foot section is hook-shaped and configured to engage behind the undercut.

13. The gas turbine as recited in claim 11, wherein the foot section includes a circumferential locking mechanism.

14. The gas turbine as recited in claim 13, wherein the locking mechanism includes a locking groove disposed in the foot section and extending in an axial direction, wherein the locking groove engages a locking pin of the flange, and the locking groove communicates with the bottom surface of the foot section.

15. The gas turbine as recited in claim 1, further comprising:
a sealing mechanism disposed between the at least two sealing segments so as to seal a gap between the at least two sealing segments.

16. The gas turbine as recited in claim 15, wherein the sealing mechanism is formed by a sealing groove disposed on a side face of one of the at least two sealing segments and a knife-edge disposed on a side face of another of the at least two sealing segments corresponding to the at least one sealing groove.

17. The gas turbine as recited in claim 1, wherein the at least two sealing segments each include a curved surface having a plurality of cooling holes for a passage of cooling air.

18. The gas turbine as recited in claim 1, wherein an underside of the foot section has a corrugated surface.

19. The gas turbine as recited in claim 1, wherein each sealing segment has an upper section that extends in a straight line, and a lower section of the sealing segment is double-curved, and in a region of an upper first curve, cooling holes which are distributed in the circumferential direction, are located in a wall of the sealing segment.

* * * * *